(12) United States Patent
Cordina

(10) Patent No.: US 6,668,137 B1
(45) Date of Patent: Dec. 23, 2003

(54) FEED FORWARD OPTICAL POWER CONTROL

(75) Inventor: Kevin J Cordina, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/180,575

(22) Filed: Jun. 26, 2002

(51) Int. Cl.[7] .............................................. H04J 14/02
(52) U.S. Cl. ...................................................... 398/94
(58) Field of Search ............................. 398/25, 30, 34, 398/38, 39, 90, 94, 120, 197; 323/266, 902

(56) References Cited

U.S. PATENT DOCUMENTS

| | | | | |
|---|---|---|---|---|
| 6,031,647 A | * | 2/2000 | Roberts | 398/94 |
| 6,222,652 B1 | * | 4/2001 | Roberts | 398/25 |
| 6,268,945 B1 | * | 7/2001 | Roberts | 398/38 |
| 6,304,347 B1 | * | 10/2001 | Beine et al. | 398/38 |
| 6,392,769 B1 | * | 5/2002 | Ford et al. | 398/9 |
| 6,501,580 B1 | * | 12/2002 | Ishikawa et al. | 398/148 |
| 6,504,630 B1 | * | 1/2003 | Czarnocha et al. | 398/15 |

* cited by examiner

Primary Examiner—Matthew V. Nguyen
(74) Attorney, Agent, or Firm—Barnes & Thornburg

(57) ABSTRACT

A power control arrangement for an optical transmission system involves detecting optical power upstream of a delay element, adjusting a perchannel optical power in the optical path downstream of the delay element to maintain the optical power constant. Such a feed forward arrangement enables power transients to be detected in time for pre-emptive control to suppress transients which are too fast to be suppressed otherwise by conventional control of optical amplifiers. This enables a reduction in power margins, and prevents damage to sensitive receivers for example. Such controllers can be distributed through networks and provided at interfaces with other optical networks to enable third party wavelengths to be carried with less risk of damaging transients propagating through the network.

19 Claims, 3 Drawing Sheets

FEED FORWARD OPTICAL POWER CONTROL

FIELD OF THE INVENTION

This invention relates to optical power control arrangements for optical transmission systems, to receivers, optical interfaces, demultiplexers, add drop multiplexers, optical switches, all incorporating power control arrangements, to distributed power control arrangements, to optical power controller components, to methods of controlling optical power, to methods of coupling wavelengths via an optical interface, and methods of offering a data transmission service over optical transmission systems.

BACKGROUND TO THE INVENTION

It is known to control optical power level in optical WDM (Wavelength Division Multiplexed) transmission systems, and it is very important to control it accurately and consistently. Optical power is a principal factor limiting reach in amplified systems and therefore determining how many repeaters or regenerators are needed. This affects capital cost and maintenance costs. Optical power level also limits data rate and therefore capacity. Optical power can be considered in terms of total optical power of all WDM channels in the same optical path, or power per channel. If total power is too high, effects such as Stimulated Raman Scattering can lead to distortion of channel powers (see copending US patent application entitled "CONTROL OF SRS INDUCED TRANSIENTS" Nortel Networks ref 15240). If per channel powers are too high non-linear effects such as Self Phase Modulation (SPM) can limit the achievable bit error rate, non-linear effects such as SPM cannot be compensated for and hence must be avoided. If power per channel is too low, then at the channel receiver at the end of the optical path, the signal will be harder to distinguish from noise, and unwanted bit errors will occur.

Conventionally, power variations were known to include long term variations in total power level, and short term or transient variations. The longer term variations were compensated by amplifier control loops, both feed forward and feed back loops, based on total optical power detected before and after the amplifier, or by adjustment of the transmitter power via feedback control systems. However, the gain of optical amplifiers can only be controlled for all channels, not separately for individual channels. The speed of amplifier gain control is also limited by the characteristics of the control loop and the optical behaviour of the amplifier, similarly changing the power of the transmitter is a slow process due to the long feedback path to instruct the laser to change its power.

So short term variations or transients, are usually not compensated, but are tolerated by providing margins in the power budget at the design stage, and/or by providing for error correction of bits at the receiver for example. U.S. Pat. No. 6,222,652 (Roberts) shows how sources of transients can be detected, and discusses their causes.

Erbium doped fibre amplifiers can cause amplitude transients when amplifying several wavelengths at once. Consider the simple example of two wavelengths, if one wavelength is instantaneously removed while the pump power remains constant, then the output power at the other wavelength will increase by approximately 3 dB. The speed of the output transient is determined by the pump power and by the response of the Erbium doped fibre to changes in input power and is measured in microseconds. Addition of a second wavelength causes a similar 3 dB drop in the output power of the first wavelength present. In networks equipped with Optical Add/Drop functionality the number of wavelengths propagating through a given amplifier can change during the lifetime of a network, due to reconfiguration of the network or through failures within the network. In addition amplifiers and other optical elements have a polarisation dependent gain or loss and changes in polarisation thereby cause changes in power level. Even vibrations and mechanical movement of optical fibres, connectors and other components of the optical path can alter the loss and so cause variations in the optical power.

Further problems concerning optical power level control on a network wide basis are set out in U.S. Pat. No. 6,392,769. Here, it sets out that in each amplifier node of the WDM system it is desirable to maintain the transmitted power within a small range (typically about 1 dB variation). To accomplish power management at a node, it is possible to use an automatic level controller consisting of a power tap into a detector and an adjustable loss element (optical attenuator) with a simple feedback control loop which continuously compares the power level to a desired value, and adjusts the attenuation to maintain the power level at the desired value. However, real WDM networks include cascades of (typically nonlinear) fiber, amplifiers, and loss elements. The resulting system is nonlinear and potentially chaotic, such that when the simple control algorithm described is independently utilized in each span, the result can generate oscillations in power levels which are much worse (larger in amplitude and faster in frequency) than the original level fluctuations which the system is intended to correct. Further, while this kind of problem can occur in single wavelength networks, it is compounded by inter-wavelength interactions in WDM networks, and grows increasingly difficult to predict as the number of wavelengths increases. Finally, networks which deliberately add and drop wavelengths from a WDM span will need to be dynamically reconfigured. This patent proposes addressing the problem by eliminating feedback instabilities arising from interactions between automatic control loops at the amplifier nodes of an optical network by restricting operation to a single amplifier node at a time. Amplifier node activation is accomplished using a global control signal which is sequentially passed from an upstream node through all of the nodes of the system. This can be a very slow process as only one node can change its behaviour at a time.

U.S. Pat. No. 6,304,347 shows some known optical power management strategies for managing signal power levels in an optical network. In one power management strategy, a consistent output power per wavelength is maintained between neighboring network elements in an OBSLR (optical bidirectional switched line ring) network. Consistent means that the signal power level between network elements will not change significantly enough, over any switching condition in the network, to affect the ability of the network to carry traffic. This localizes power management within each node since input power levels to the nodes remain constant. As a result, power management in the network becomes a function of each node's internal component configuration and optical path variations. In this strategy all switching scenarios are folded into a small set of operating modes.

In another power management strategy shown in this patent, signal power parameters for different network switching scenarios are tracked. Thus, it is possible to optimize the available signal-to-noise ratio (SNR) in the network at the cost of calculating, storing and exchanging signal power parameters around the optical network. In another power management strategy, signal power parameters for different network switching scenarios are pre-computed and stored. The pre-computed values provide a way for network elements to quickly react to switching events without necessarily having to re-compute parameters as each event occurs.

U.S. Pat. No. 6,268,945 (Roberts) entitled "Stable power control for optical transmission systems", shows an optical transmission system, in which changes in optical power are anticipated and damped by controlling the transmitter output power, or an external damping element. For WDM systems, wavelengths can be added or removed without causing rapid changes in total power which would otherwise disturb the output of downstream optical amplifiers, and cause bit errors.

SUMMARY OF THE INVENTION

It is an object of the present invention to provide improved apparatus and methods. According to a first aspect of the present invention, there is provided an optical power control arrangement for an optical transmission system, the arrangement comprising:

an optical delay element in an optical path of the system,
an optical power detector upstream of the delay element,
a power adjusting element for adjusting a per channel optical power in the optical path downstream of the delay element, and
a controller for controlling the power adjusting element to maintain the per channel optical power constant, using an output fed forward from the detector.

An advantage of a feed forward arrangement around a delay is that power transients can be detected in time for pre-emptive control to suppress transients which are too fast to be suppressed by conventional feed back control of optical amplifiers. Suppressing such transients is a radical departure from the conventional approaches described above, of providing power margins and/or error correction, and trying to detect transient sources. Notable consequences include the ability to reduce power margins, prevent damage to components such as receivers, and relax the specifications on other components such as the responsiveness of optical amplifier control loops. In WDM networks, limitations on how many wavelengths can be added or dropped at the same time can be relaxed. Similarly in wavelength routed networks, limitations on dynamic adding and dropping of wavelengths can be relaxed. As propagation of transients can be reduced or prevented, more complex networks can be contemplated, with less risk of chaotic instability. Particularly significant is the ability to prevent propagation of such transients between optical networks of different operators. The risk of damage or untraceable errors from such transients has been a major factor in limiting use of optical interfaces between networks. Reducing the need to have electrical interfaces, could thus appreciably reduce costs and improve service.

By ensuring the power falling on the receiver remains constant, and the system can always be operated at the optimum point, regardless of changes in power arriving at the receiving site. Optical powers along a system may evolve very rapidly due to faults, or other mechanisms. Optical amplifiers present in the system may not be able to fully suppress any transients and may inflict cross gain modulation onto other channels which were not originally affected. Clearly if these changes in power propagate to the receiver the effects described above may occur.

As a preferred feature, the power controller comprises a variable optical attenuator. This can be simpler to control and less costly than other possibilities, though if it is to compensate for both positive and negative transients, then the VOA cannot be normally operating at zero attenuation. Therefore there will be a loss of power in the steady state.

As another preferred feature, the power controller comprises an optical amplifier. This enables both positive and negative transients to be suppressed.

As another preferred feature, the control arrangement is arranged to detect an unwanted change in optical power at the detector, determine a compensating change in the control of the power adjusting element, and arranged to synchronise the compensating change with the unwanted change as it appears at the input of the power adjusting element. This can enable transients to be compensated more accurately.

As another preferred feature, the controller has a look up table. This is relatively easy and cost effective to implement.

As another preferred feature, the delay element is a dispersion compensation module. Other alternatives for the delay can include an extra length of fibre or particular waveguide materials for example. This can help keep component count lower, as one module can have the dual function of compensating for dispersion and providing a delay.

Another aspect of the invention provides a receiver having the above control arrangement. This is the part of the system where constant power is most critical, to prevent damage or prevent bit errors. If the power falling on the optical detector in the receiver varies, it is possible to cause damage, or to reduce the performance of the system.

Another aspect of the invention provides an optical interface for coupling one or more third party wavelengths into an optical transmission system, the interface having the above control arrangement for controlling the power of the one or more third party wavelengths. This may be one of the most commercially significant applications of the control arrangement.

Another aspect of the invention provides a wavelength division demultiplexer for demultiplexing a wavelength multiplexed optical signal into demultiplexed signals each carrying a channel or sub bands of more than one channel, the demultiplexer having the above control arrangement for one or more of the demultiplexed signals.

Another aspect of the invention provides an optical add drop multiplexer for adding or dropping optical signals carrying a channel or sub bands of channels to or from a wavelength multiplexed optical signal, the add drop multiplexer having the above control arrangement for one or more of the signals being added or dropped.

Another aspect of the invention provides an optical switch for switching optical signals carrying a channel or a sub band of channels, the switch having the above control arrangement for one or more of the signals being added or dropped.

Another aspect of the invention provides a distributed optical power control arrangement for an optical transmission system, comprising a series of the above control arrangements distributed along an optical path of the system.

This can enable transients to be suppressed and gain to be controlled along the path, so that each control arrangement need perform only a part of the total compensation, potentially easing the requirements of each control arrangement, or enabling more complex networks to be implemented.

As a preferred feature of the distributed arrangement, the system is a wavelength division multiplexed system, the control arrangements being located where the optical signals are demultiplexed for routing. As the signals are typically demultiplexed for routing by optical switches or OADMs, it is beneficial to ensure constant gain at such points to reduce propagation of transients onto different routes. It is harder to suppress such transients when they have propagated onto routes where only some of the wavelengths have the transients. Also, it is preferable to avoid demultiplexing the signal more often than necessary, to avoid performance deterioration and reduce costs. Hence it is beneficial to locate the per channel power control arrangements where the signal is demultiplexed for other reasons.

Another aspect of the invention provides an optical power controller component for use in controlling a power adjusting element located downstream of a delay element in an optical path of an optical transmission system, the component being arranged to use a detection of a power level change upstream of the delay element to control the power adjusting element to compensate for the change when it reaches the power adjusting element.

This aspect is a principal component of the power control arrangement. It can be used as an upgrade to existing systems already having other parts of the arrangement, such as a delay element followed by a power adjusting element.

Another aspect of the invention provides a method of controlling optical power in an optical transmission system, comprising the steps of:

detecting optical power in an optical path of the system upstream of a delay element, adjusting a per channel optical power in the optical path downstream of the delay element, to maintain the per channel optical power constant, using the detected optical power.

Another aspect of the invention provides a method of coupling one or more third party wavelengths into an optical transmission system via an optical interface, the interface having the above power control arrangement for controlling the power of the one or more third party wavelengths.

Other aspects of the invention include software for implementing the power controller component or for carrying out (which encompasses controlling) the method steps. This acknowledges that such software can be a valuable, separately tradable commodity. A power controller in the form of software is intended to encompass software which runs on or controls "dumb" or standard hardware, to carry out the desired functions, (and therefore the software essentially defines the functions of the compensator, and can therefore be termed a compensator, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions. The controller could be implemented using just analogue and/or digital electronics, with no DSP or software Another aspect provides a method of offering a data transmission service over an optical transmission system having the above power control arrangement. Another aspect of the invention provides a method of offering a data transmission service using a third party wavelength carried by an optical transmission system and using the above optical interface. As the advantages of the invention can enable a better network, which is more reliable or more flexible, or has greater capacity, or is more cost effective for example, consequently a data transmission service over the network can show a corresponding improvement, and the value of such services can increase. Such increased value over the life of the system, could prove far greater than the sales value of the equipment.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Figure 1:
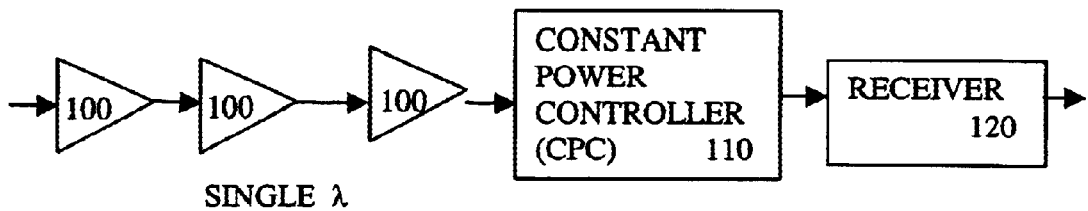
FIG. 1 shows an optical transmission system having a power control arrangement according to a first embodiment of the invention.

FIG. 1, Transmission System having Constant Power Controller

FIG. 1 shows in schematic form a typical optical transmission system. It has a string of optical amplifiers 100 for transmitting a single channel or wavelength. At a receiver 120, a power control arrangement in the form of a constant power controller (CPC) 110 is provided in the optical path before an optical detector of the receiver. Transients occurring along the transmission line can be suppressed by the constant power controller. Although it is essentially a per channel power controller, if there are a number of wavelengths multiplexed together, and if the wavelengths cannot be separately added or dropped, then, provided gain tilt across the different wave lengths is not an issue, the constant power controller can be arranged to operate on multiple wavelengths. This still effectively gives per channel power control. The desired constant power level which the controller tries to maintain can be set internally, or can be adjusted for example by feedback from the receiver, or centrally from a network management system (not illustrated).

Figure 2:
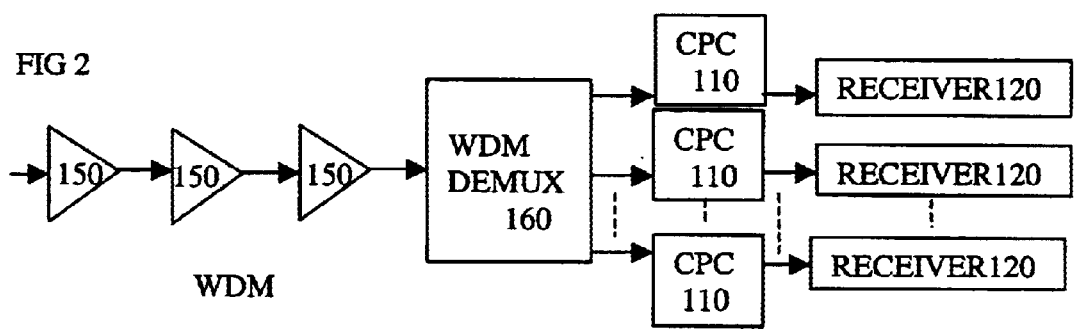
FIG. 2 shows another optical transmission system having a WDM demux, and power control arrangements according to embodiments of the invention.

FIG. 2, WDM Demux with Constant Power Controller

FIG. 2 shows another optical transmission system according to another embodiment of the invention. In this case, a WDM signal is transmitted along a string of wide band optical amplifiers 150. At the receiver end, the WDM signal is demultiplexed by a WDM demux 160. The demultiplexed signals are fed to individual receivers 120 via CPCs 110. The transmission system can be a point to point system, or other configurations such as ring networks, star networks, and mesh networks, for example. As in FIG. 1, the constant power controller for each channel may be arranged to keep the power constant at a level set internally, or to a level which can be adapted externally.

The constant power controller can in principle be placed upstream of the WDM demux if the number of channels is small and if they are not added or dropped or reconfigured individually. Other CPCs may be arranged in distributed fashion further upstream along the optical path, preferably at the locations where a demultiplexer is provided, such as OADM sites, as described below with reference to FIG. 3.

Figure 3:
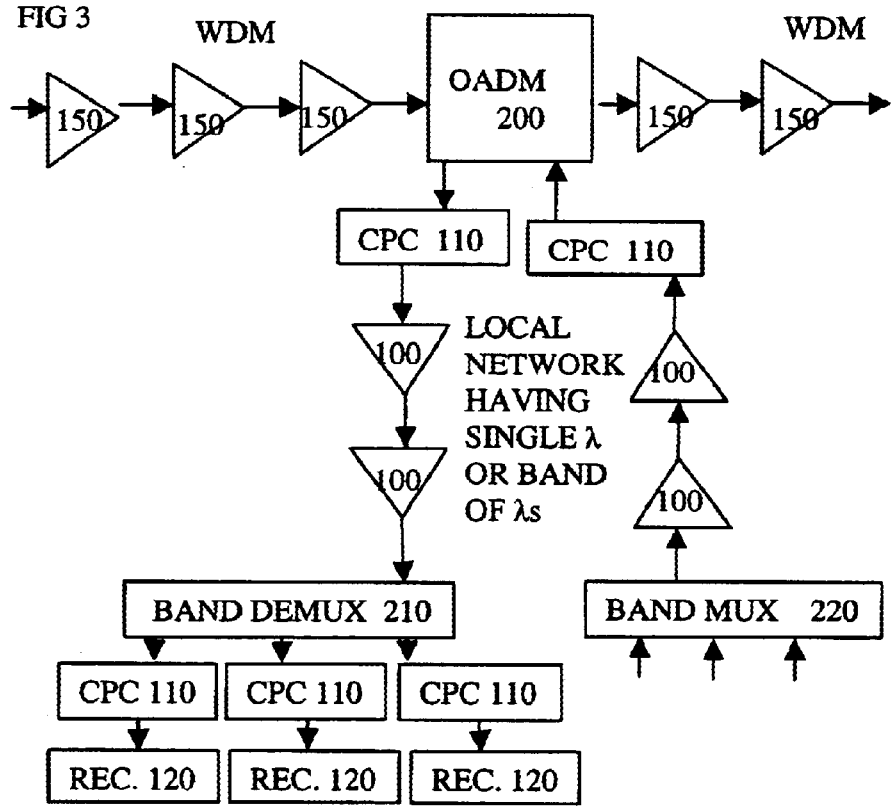
FIG. 3 shows another optical transmission system having an OADM according to another embodiment of the invention.

FIG. 3, OADM with Power Controller

FIG. 3 shows another embodiment of the invention with an OADM 200 in between sections of the optical path. Each section can have strings of optical amplifiers 150 as in FIG. 2. In this case, single wavelengths or subbands of a small number of wavelengths are added or dropped, and a constant power controller 110 is provided at the OADM site for ensuring the power level is constant for wavelengths added or dropped to the main wavelengths division multiplexed optical path. The wavelength or wavelengths dropped may be converted to electrical form in a receiver located at the OADM, or alternatively, as shown, the wavelength may be carried along a local amplified path to a remote receiver. Optionally, CPCs can be provided also for the wavelengths not being dropped. This is a convenient location in the network for such control, being a location where the number of wavelengths can change. As such change is a principal source of power changes, this provides a remedy at the source of the problem, before it has a chance to build up and propagate.

As illustrated, amplifiers 100 are provided in the drop path leading to a subband demultiplexer 210. Here the subband is split into individual wavelengths, each passing through a further power controller 110 before arriving at the receiver 120. If only one wavelength is transmitted along this path, then there is no need for the subband demultiplexer 210, nor any need for more than one receiver. In the other direction, the wavelength being added passes through a subband multiplexer 220, amplifiers 100, and a power controller 110 located at the OADM.

Figure 4:
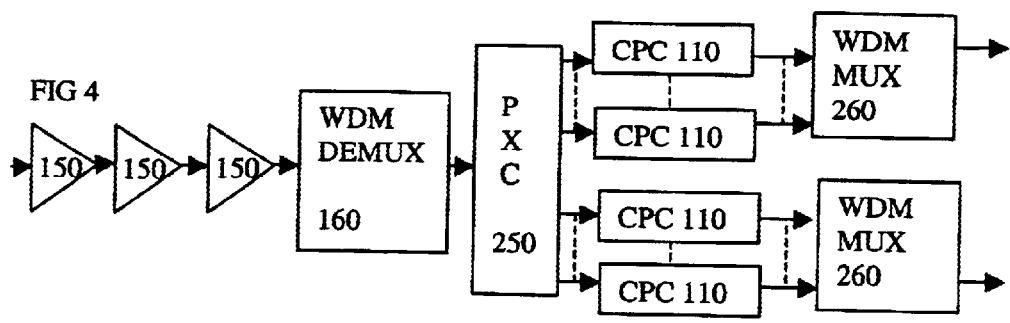
FIG. 4 shows another optical transmission system having an optical switch according to another embodiment of the invention.

FIG. 4, Transmission Network with Optical Switch having Power Controllers

FIG. 4 shows another optical transmission system according to another embodiment. This may be combined with previous embodiments. In this case, the wavelength division multiplexed signal is passed through a series of line amplifiers 150 leading to an optical switch. The optical switch includes a WDM demux 160, followed by a photonic cross-connect 250 for optically switching the demultiplexed channels or wavelengths. They may be switched to different output ports. At each output port a WDM multiplexer 260 multiplexes the wavelengths for onward transmission along another series of line amplifiers (not illustrated). CPCs are provided on each of the optical paths of the demultiplexed signals. Preferably they are provided after the photonic cross-connects, so that power level changes introduced by the photonic cross-connects can be compensated out. In principle the CPCs can be located before the PXC, or even in both locations, as desired to suit the system. The PXC can be implemented using any of a variety of known techniques, as would be appreciated by those skilled in the art, and so need not be described here in more detail.

An advantage of locating the power controllers at the PXC is that transients can be prevented from propagating down several different optical paths. This is significant partly because line amplifiers inevitably cause transients appearing on one channel to be spread to other previously unaffected channels multiplexed to paths through the same amplifier. In complex networks this can contribute to chaotic instability, particularly if a transient is severe enough to trigger protection switching which itself can cause more transients if one or more wavelengths are rerouted.

Figure 5:
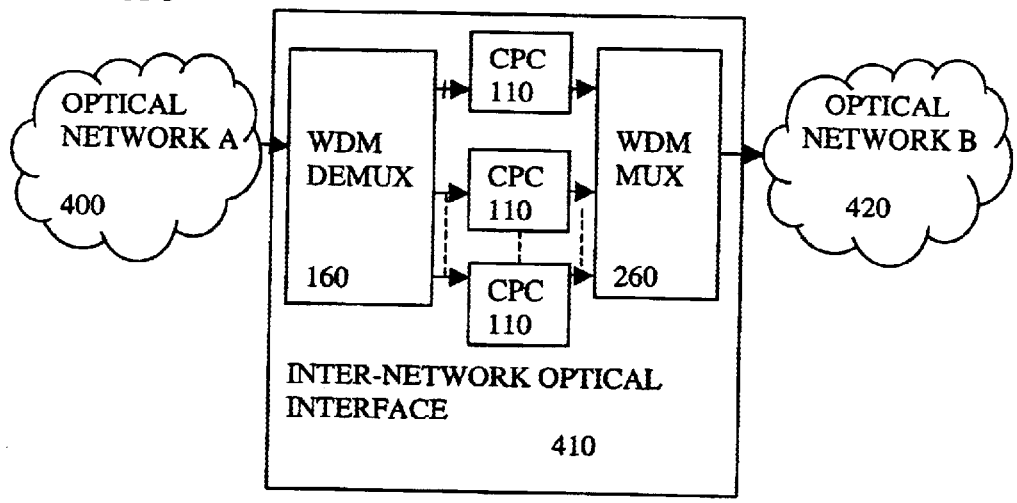
FIG. 5 shows an optical interface according to another embodiment of the invention, for interfacing between optical networks.

FIG. 5, Internetwork Optical Interface

FIG. 5 shows an internetwork optical interface 410 according to another embodiment of the invention. It provides an optical interface between optical networks A and B, 400, 420. If either or both of these networks include CPCs as described above, this can create a distributed control arrangement where power control is located at various points along an optical path. Power controllers are provided within the internetwork optical interface 410 to prevent transients being propagated from optical network A 400, through to optical network B 420. This enables third party wavelengths from optical network A to be transmitted through optical network B, with knowledge that changes within network A will not affect the continued operation of network B.

The internetwork optical interface includes a WDM demux 160, CPCs 110 on each of the optical paths of the demultiplexed signals, and a corresponding WDM multiplexer 260 for multiplexing the power controlled signals. Optionally the interface may include other elements such as line amplifiers, other compensation modules such as dispersion compensation modules, and other monitoring equipment for ensuring the optical signals are of sufficient quality before they enter optical network B. These parts are not shown for the sake of clarity.

Optionally, the WDM demux and WDM mux functions may be dispensed with if only one wavelength is being passed between optical network A and network B. This would be the case if either network is not a WDM multiplexed transmission system for example, but instead is a simple transmitter or receiver and optical path, belonging to a third party.

Figure 6:
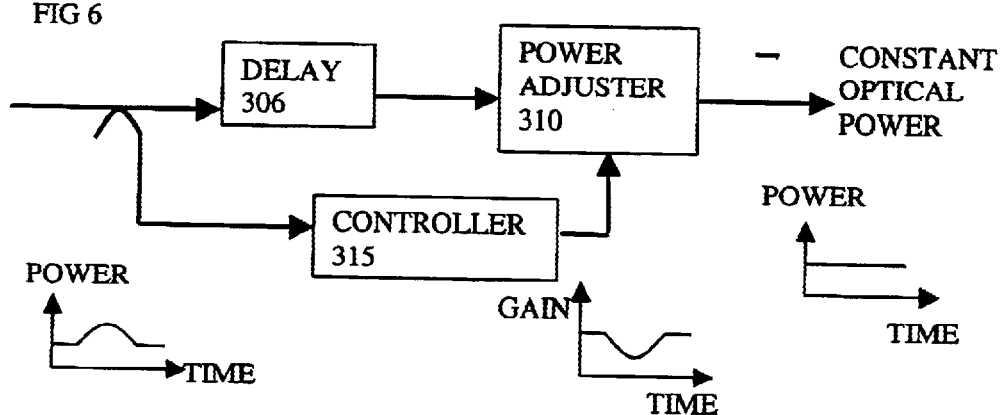
FIG. 6 shows an optical power controller according to another embodiment of the invention.

FIG. 6, Power Controller

FIG. 6 shows a constant power controller according to an embodiment of the invention, for use in the embodiments shown above, or in other embodiments. It includes a delay 300 in the main optical path. A power adjuster 310 is also in the optical path, downstream of the delay element. A controller 315 is arranged to control the power adjuster 310. The controller receives an input from an optical tap, upstream of the delay element 300.

In operation, when the optical power level in the optical path leading to the delay line changes, this is detected by the controller 315. A graph showing a transient change in power with time is illustrated in FIG. 6. The controller outputs a corresponding control signal to control the power adjuster 310. A typical graph of gain varying with time as illustrated in FIG. 6, represents an example of the operation of the control signal output by the controller 315. The timing and profile of the control signal depends on the delays and other characteristics of the power adjuster 310. If the power adjuster is an attenuator, the profile of the control signal would be inverted, for example. It is designed to be synchronised with the change in the power reaching the power adjuster from the delay 300. The resulting power at the output of the power adjuster should be constant as shown FIG. 6. It would be conceivable to add a feedback loop by tapping off the output of the power adjuster and feeding it back to the controller 315 (not illustrated). This would enable the controller to adapt the timing or synchronisation of the compensation, and the level of the compensation, to improve the control.

Figure 7:
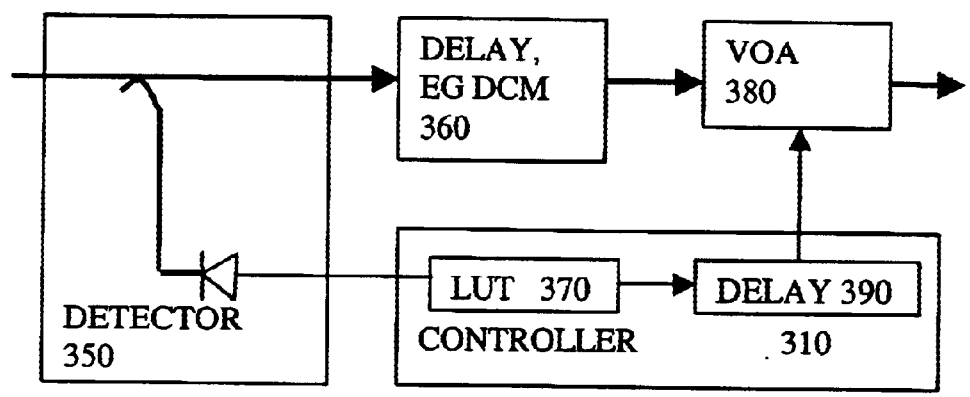
FIG. 7 shows another optical power controller according to an embodiment of the invention.
Figure 8:
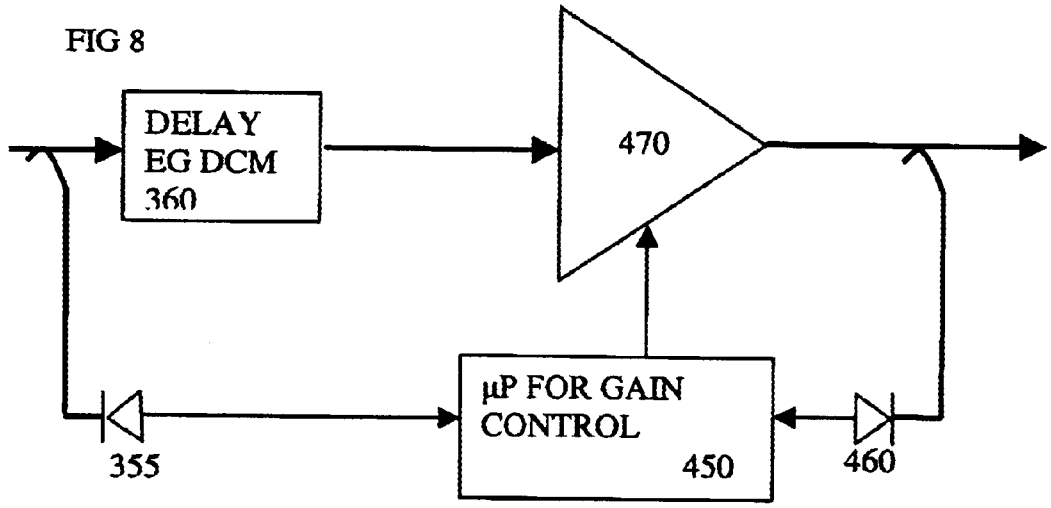
FIG. 8 shows another optical power controller according to another embodiment of the invention.

As shown in FIGS. 7 and 8 below, the power adjuster may be implemented in the form of a VOA, or an optical amplifier for example. Other power adjusters could be used such as adaptive equalizers or tilting VOAs, which in principle could give different amounts of compensation for each of a number of channels simultaneously, though at the expense of considerably more complex control.

The controller 350 could be implemented in various ways, depending on the type of power adjuster, and the speed of response required, which depends on the delay 300, as well as the type of power adjuster. FIGS. 7 and 8 show examples.

FIG. 7, Embodiment of a Power Controller using a VOA

FIG. 7 shows another embodiment of the invention, in the form of a power control arrangement which may be used in optical transmission system embodiments shown above, or in other arrangements. The arrangement is similar to that shown in FIG. 6. In this case the delay is in the form of a dispersion compensation module 360. The power adjuster is in the form of a VOA 380. A detector 350 is typically implemented with an optical tap and a photodiode 355. The output of the photodiode is fed to the controller 310. The controller includes a lookup table (LUT) 370. The output of the lookup table is fed via an optional delay element 390 to control the level of attenuation of the VOA 380. The lookup table is chosen for the sake of simplicity and speed of operation. An equivalent control algorithm could be implemented as a series of logic operations carried out by conventional hardware or software, such as programmable hardware or a simple microprocessor or utilising an analogue control system. The lookup table would have the power level as its input, and for each level of input, the table would have a corresponding output for setting a compensating VOA attenuation level. Fast VOAs are now available which can change attenuation in hundreds of nanoseconds or less, for a 30 dB change. The amount of delay provided by delay element 390 to match the delay of the DCM may be in the order of microseconds or possibly milliseconds. This delay can of course be integrated as part of the function of the look up table. A typical DCM has kilometres of fiber which would give milliseconds of delay. This is more than enough time for conventional electronics to perform a lookup, or time for a microprocessor to execute many instructions. The delay in 390 may be implemented so as to be variable or controllable if accurate synchronisation is required.

If the DCM or corresponding delay element 360 has even as little as 200 metres of fiber, this would give around one microsecond of delay, which is also plenty of time for conventional electronics to perform a lookup table operation. Typically transient rise times are no shorter one microsecond in amplified optical transmission systems, because the response time of the line amplifiers limit the rise and fall times of any transients. Thus to achieve good compensation, the compensating change must by synchronised to a similar or greater accuracy than this.

FIG. 8, Power Controller using Optical Amplifier

FIG. 8 shows another embodiment of a power controller for use in the optical transmission system described above, or in other optical transmission systems. In this case, the arrangement is similar to those of FIGS. 6 and 7, but the power adjuster is implemented as an optical amplifier 470. Typically these are rare earth doped fiber amplifiers, though in principle, semiconductor amplifiers could be used. Such amplifiers are usually more complicated to control than a VOA. Accordingly, typically a microprocessor 450 is provided for gain control of the optical amplifier. A feedback loop is shown, using an optical tap from the output of the optical amplifier, via a photodiode 460, to the microprocessor 450. The feed forward part for transient compensation can be achieved either by directly influencing the gain, or by altering the characteristics of the feedback loop, or both. As the optical amplifier is usually relatively slow to respond, the output of the microprocessor would need to be altered a short period before the anticipated arrival time of the transient at the input of the optical amplifier 470.

An advantage of using an optical amplifier is that positive and negative transients can be compensated without a loss in power. In contrast, if a VOA is used, if it is to compensate for both positive and negative transients, then the VOA cannot be normally operating at zero attenuation. Therefore there will be a loss of power in the steady state, unlike the case of the optical amplifier.

Concluding Remarks

As has been described above, a power control arrangement for an optical transmission system involves detecting optical power upstream of a delay element, adjusting a per channel optical power in the optical path downstream of the delay element to maintain the optical power constant. Such a feed forward arrangement enables power transients to be detected in time for pre-emptive control to suppress transients which are too fast to be suppressed otherwise by conventional control of optical amplifiers. This enables a reduction in power margins, and prevents damage to sensitive receivers for example. Such controllers can be distributed through networks and provided at interfaces with other optical networks to enable third party wavelengths to be carried with less risk of damaging transients propagating through the network.

Other variations will be apparent to those skilled in the art, having corresponding advantages to those set out above, within the scope of the claims.

What is claimed is:

1. An optical power control arrangement for an optical transmission system, the arrangement comprising:

an optical delay element in an optical path of the system, an optical power detector upstream of the delay element, a power adjusting element for adjusting a per channel optical power in the optical path downstream of the delay element, and a controller for controlling the power adjusting element to maintain the per channel optical power constant, using an output fed forward from the detector.

2. The control arrangement of claim 1, the power controller comprising a variable optical attenuator.

3. The control arrangement of claim 1, the power controller comprising an optical amplifier.

4. The control arrangement of claim 1, arranged to detect an unwanted change in optical power at the detector, determine a compensating change in the control of the power adjusting element, and arranged to synchronise the compensating change with the unwanted change as it appears at the input of the power adjusting element.

5. The control arrangement of claim 1, the controller having a look up table.

6. The control arrangement of claim 1, the delay element being a dispersion compensation module.

7. A receiver having the control arrangement of claim 1.

8. An optical interface for coupling one or more third party wavelengths into an optical transmission system, the interface having the control arrangement of claim 1 for controlling the power of the one or more third party wavelengths.

9. A wavelength division demultiplexer for demultiplexing a wavelength multiplexed optical signal into demultiplexed signals each carrying a channel or sub bands of more than one channel, the demultiplexer having the control arrangement of claim 1 for one or more of the demultiplexed signals.

10. An optical add drop multiplexer for adding or dropping optical signals carrying a channel or sub bands of channels to or from a wavelength multiplexed optical signal, the add drop multiplexer having the control arrangement of claim 1 for one or more of the signals being added or dropped.

11. An optical switch for switching optical signals carrying a channel or a sub band of channels, the switch having the control arrangement of claim 1 for one or more of the signals being added or dropped.

12. A distributed optical power control arrangement for an optical transmission system, comprising a series of the control arrangements of claim 1 distributed along an optical path of the system.

13. The distributed arrangement of claim 12, the system being a wavelength division multiplexed system, the control arrangements being located where the optical signals are demultiplexed for routing.

14. An optical power controller component for use in controlling a power adjusting element located downstream of a delay element in an optical path of an optical transmission system, the component being arranged to use a detection of a power level change upstream of the delay element to control the power adjusting element to compensate for the change when it reaches the power adjusting element.

15. The power controller component of claim 14 implemented in the form of software.

16. A method of controlling optical power in an optical transmission system, comprising the steps of:
   detecting optical power in an optical path of the system upstream of a delay element,
   adjusting a per channel optical power in the optical path downstream of the delay element, to maintain the per channel optical power constant, using the detected optical power.

17. A method of coupling one or more third party wavelengths into an optical transmission system via an optical interface, the interface having the power control arrangement of claim 1 for controlling the power of the one or more third party wavelengths.

18. A method of offering a data transmission service over an optical transmission system having the power control arrangement of claim 1.

19. A method of offering a data transmission service using a third party wavelength carried by an optical transmission system and using the optical interface of claim 8.

* * * * *